(12) United States Patent
Briggs et al.

(10) Patent No.: US 11,465,140 B2
(45) Date of Patent: Oct. 11, 2022

(54) OBJECT PICKING APPARATUS WITH IMAGING-BASED LOCATING OF PIPETTE TIP

(71) Applicant: Molecular Devices, LLC, San Jose, CA (US)

(72) Inventors: Jason Briggs, Pleasanton, CA (US); Paula Gedraitis, Hopkinton, MA (US); Trisha A Mitlo, San Lorenzo, CA (US)

(73) Assignee: Molecular Devices, LLC, San Jose, CA (US)

( * ) Notice: Subject to any disclaimer, the term of this patent is extended or adjusted under 35 U.S.C. 154(b) by 118 days.

(21) Appl. No.: 16/632,059

(22) PCT Filed: Jul. 9, 2018

(86) PCT No.: PCT/US2018/041271
§ 371 (c)(1),
(2) Date: Jan. 17, 2020

(87) PCT Pub. No.: WO2019/018152
PCT Pub. Date: Jan. 24, 2019

(65) Prior Publication Data
US 2020/0147601 A1 May 14, 2020

Related U.S. Application Data

(60) Provisional application No. 62/533,767, filed on Jul. 18, 2017.

(51) Int. Cl.
*B01L 3/02* (2006.01)
*B01L 9/00* (2006.01)
*G01N 35/10* (2006.01)

(52) U.S. Cl.
CPC ................. *B01L 3/02* (2013.01); *B01L 9/52* (2013.01); *G01N 35/1011* (2013.01); *B01L 2200/025* (2013.01); *B01L 2300/0663* (2013.01)

(58) Field of Classification Search
None
See application file for complete search history.

(56) References Cited

U.S. PATENT DOCUMENTS

| 5,138,868 A | 8/1992 | Long |
| 6,377,346 B1 | 4/2002 | Vaisala et al. |

(Continued)

FOREIGN PATENT DOCUMENTS

| JP | 2009-002674 | 1/2009 |
| JP | 2013-169185 | 9/2013 |
| JP | 2016-112012 A | 6/2016 |

OTHER PUBLICATIONS

International Search Report and Written Opinion for PCT/US2018/041271 dated Nov. 7, 2018.

(Continued)

*Primary Examiner* — Brian R Gordon
(74) *Attorney, Agent, or Firm* — Merchant & Gould P.C.

(57) ABSTRACT

An object such as a cell colony may be picked from a plurality of objects by acquiring an image of the objects and an image of a pipette tip. The image of the objects is analyzed to select an object of interest. The selected object is associated with a coordinate position. Based on the coordinate position, the pipette tip is positioned over the selected object. An image of the pipette tip is then acquired and analyzed. The pipette tip is associated with a coordinate position. A positional error between the coordinate position of the selected object and the coordinate position of the pipette tip is determined. Based on the positional error, the pipette tip and/or a sample holder supporting the objects is moved to align the pipette tip over the selected object, by matching the coordinate position of the pipette tip with the coordinate position of the selected object.

9 Claims, 10 Drawing Sheets

(56) References Cited

U.S. PATENT DOCUMENTS

| | | | |
|---|---|---|---|
| 8,034,625 B2 | 10/2011 | Richmond et al. | |
| 2001/0033381 A1* | 10/2001 | Stumbo | G01N 35/028 356/440 |
| 2001/0049148 A1* | 12/2001 | Wolk | B01L 3/02 204/453 |
| 2002/0102598 A1* | 8/2002 | Lafferty | B25J 9/1697 435/6.12 |
| 2002/0160443 A1* | 10/2002 | Tsipouras | G06V 20/695 435/6.12 |
| 2003/0075556 A1* | 4/2003 | Tajima | G01N 35/1016 222/23 |
| 2004/0062686 A1* | 4/2004 | Ganz | B01J 19/0046 422/504 |
| 2004/0092001 A1 | 5/2004 | Bedingham et al. | |
| 2004/0096984 A1 | 5/2004 | Elverd et al. | |
| 2004/0102742 A1* | 5/2004 | Tuyl | G01N 35/1074 604/298 |
| 2005/0100480 A1* | 5/2005 | Webb | G01N 35/1074 536/25.3 |
| 2005/0136534 A1* | 6/2005 | Austin | G01N 35/1009 427/2.11 |
| 2005/0151092 A1 | 7/2005 | Kitagawa | |
| 2006/0002824 A1* | 1/2006 | Chang | G01N 35/1016 422/400 |
| 2006/0105359 A1* | 5/2006 | Favuzzi | G01N 35/00871 435/6.19 |
| 2006/0144331 A1* | 7/2006 | Hanafusa | G01N 35/1011 118/712 |
| 2007/0207535 A1* | 9/2007 | Matsuo | B01L 3/0275 435/287.1 |
| 2008/0047368 A1* | 2/2008 | Marziali | G01N 35/1011 422/63 |
| 2011/0124037 A1 | 5/2011 | Backhaus et al. | |
| 2011/0220777 A1* | 9/2011 | Clinton | G01N 33/54366 250/214.1 |
| 2013/0029856 A1* | 1/2013 | Kelso | G01N 35/1011 435/6.12 |
| 2014/0170026 A1* | 6/2014 | Uno | G01N 35/1011 222/1 |
| 2016/0169775 A1 | 6/2016 | Kei | |
| 2016/0205360 A1* | 7/2016 | Allen | H04N 9/3194 348/745 |
| 2017/0131315 A1* | 5/2017 | Ito | B01L 3/02 |
| 2017/0274372 A1* | 9/2017 | Katano | G01N 35/1002 |
| 2017/0333901 A1* | 11/2017 | Sun | C12Q 3/00 |
| 2018/0059130 A1* | 3/2018 | Iwashita | G01N 35/00623 |
| 2018/0059132 A1* | 3/2018 | Christey | G01N 35/00029 |
| 2020/0020125 A1* | 1/2020 | Sarkar | G06T 7/73 |
| 2020/0182784 A1* | 6/2020 | Nagai | G01N 33/543 |
| 2020/0200779 A1* | 6/2020 | Sigler | G01N 35/1065 |
| 2020/0355717 A1* | 11/2020 | Izume | B01L 3/5085 |
| 2021/0121871 A1* | 4/2021 | Tourniaire | G01N 35/1016 |

OTHER PUBLICATIONS

Sun, Fujun et al., "Dynamic detection and depth location of pipette tip in microinjection", 2015 International Conference on Manipulation, Manufacturing and Measurement on the Nanoscale (3M-NANO), Oct. 5, 2015 p. 90-93. See Whole Document.
Chinese 1st Office Action in Application 201880060276.5, dated Apr. 23, 2021, 23 pages.
Yang, Jian-rong, "Digital Photography", China Radio Film & TV Press, Aug. 2016, p. 48 (with English translation), 26 pages.
European Extended Search Report in Application 18836035.8, dated Mar. 21, 2021, 13 pages.
PCT International Preliminary Report on Patentability in Application PCT/US2018/041271, dated Jan. 30, 2020, 7 pages.

* cited by examiner

OBJECT PICKING APPARATUS WITH IMAGING-BASED LOCATING OF PIPETTE TIP

CROSS REFERENCE TO RELATED APPLICATION(S)

This application is a National Stage Application of PCT/US2018/041271, filed on Jul. 9, 2018, which claims priority to U.S. Provisional Patent Application No. 62/533,767 entitled "Object Picking Apparatus with Imaging-Based Locating of Pipette Tip" filed on Jul. 18, 2017, the entire disclosures of which are incorporated herein by reference.

TECHNICAL FIELD

The present invention generally relates to object picking, such as cell colony picking, with the use of an automated pipette tip. In particular, the invention relates to object picking utilizing an imaging-based approach for accurately positioning the pipette tip relative to the object to be picked.

BACKGROUND

An object picker generally is an instrument configured to isolate a single object from a group of similar objects (i.e., "pick" a selected object). In life sciences, the object is often a biological object such as a cell or microbe or a colony or cells or microbes. Such an instrument may be referred to as a cell picker or colony picker. A selected biological object is picked to enable it to be further analyzed or processed, e.g., for assaying, screening, cloning, nucleic acid sequencing, etc. As with other modern analytical and liquid handling instruments, certain functions of an object picking instrument may be automated to provide increased throughput.

In one class of object pickers, a pipette tip is utilized to pick an object, such as an adherent cell colony immersed in a liquid. The pipette tip is mounted to an adaptor of a pipette head, which is movable by a pipettor robot typically along three axes. Specifically, the pipette tip is lowered toward the object, a pump communicating with the lumen of the pipette tip creates suction, and the object is aspirated through the open distal end of the pipette tip and into the lumen. To ensure the success and accuracy of the picking operation, the pipette tip needs to be well-centered over the object being picked to avoid picking a non-selected object. This is especially critical as object density is increased, i.e., when the objects of the group are located very close to each other. The accuracy of pipette tip located can be limited by several factors, including dimensional differences between different pipette tips, poor reproducibility in an automated tipping operation (e.g., the pipette tips are not pressed onto the pipette head to the same depth and/or at the same angle every time), and limitations in the positional accuracy of the pipettor robot. Known solutions have endeavored to improve the accuracy of the robotics (e.g., motion control) and the mechanism for mounting the pipette tips, but the limitations just noted still exist. It may also be possible to utilize optical or capacitive sensors to locate the pipette tip relative to a robot arm, but such a solution still leaves room for positional error.

Therefore, it would be desirable to provide improved positioning of a pipette tip over an object to be picked.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to an embodiment, an object picking apparatus includes: an imaging system comprising a light source, a camera, and an objective, the imaging system configured to direct light from the light source to the objective and from the objective to the camera; a sample stage configured to support a sample plate, the sample plate configured to hold a plurality of objects; a pipettor configured to hold a pipette tip and move the pipette tip to one or more selected positions over the sample plate; a controller configured to: control the light source to generate an excitation light beam, wherein the excitation light beam passes through the objective and irradiates the plurality of objects, the plurality of objects in response emits a first emission light beam, and the camera receives the first emission light beam and in response outputs a first output signal; acquire an image of the plurality of objects by receiving and processing the first output signal; analyze the image of the plurality of objects and, based on the analyzing, select an object from the plurality of objects, and identify a coordinate position of the selected object in an X-Y plane; control the pipettor to move the pipette tip to a position over the selected object, wherein the excitation light beam irradiates the pipette tip, the pipette tip in response emits a second emission light beam, and the camera receives the second emission light beam and in response outputs a second output signal; acquire an image of the pipette tip by receiving and processing the second output signal; analyze the image of the pipette tip and, based on the analyzing, identify a coordinate position of the pipette tip in the X-Y plane; determine a positional error between the coordinate position of the selected object and the coordinate position of the pipette tip; and based on the positional error, control at least one of the pipettor or the sample stage to align the pipette tip over the selected object by matching the coordinate position of the pipette tip with the coordinate position of the selected object, wherein matching comprises moving at least one of the pipette tip or the sample container relative to the other.

According to another embodiment, a method for picking an object from a plurality of objects includes: providing a plurality of objects in a sample container; irradiating the plurality of objects with an excitation light beam, wherein the plurality of objects in response emits a first emission light beam; receiving the first emission light beam at a camera, wherein the camera outputs a first output signal; acquiring an image of the plurality of objects by processing the first output signal; analyzing the image of the plurality of objects and, based on the analyzing, selecting an object from the plurality of objects and identifying a coordinate position of the selected object in an X-Y plane parallel to the top surface; moving a pipette tip to a position over the selected object, wherein the excitation light beam irradiates the pipette tip, and the pipette tip in response emits a second emission light beam; receiving the second emission light beam at the camera, wherein the camera outputs a second output signal; acquiring an image of the pipette tip by processing the second output signal; analyzing the image of the pipette tip and, based on the analyzing, identifying a coordinate position of the pipette tip in the X-Y plane; determining a positional error between the coordinate position of the selected object and the coordinate position of the pipette tip; and based on the positional error, moving at least one of the pipette tip or the sample container to align the pipette tip over the selected object by matching the coordinate position of the pipette tip with the coordinate position of the selected object.

Other devices, apparatuses, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
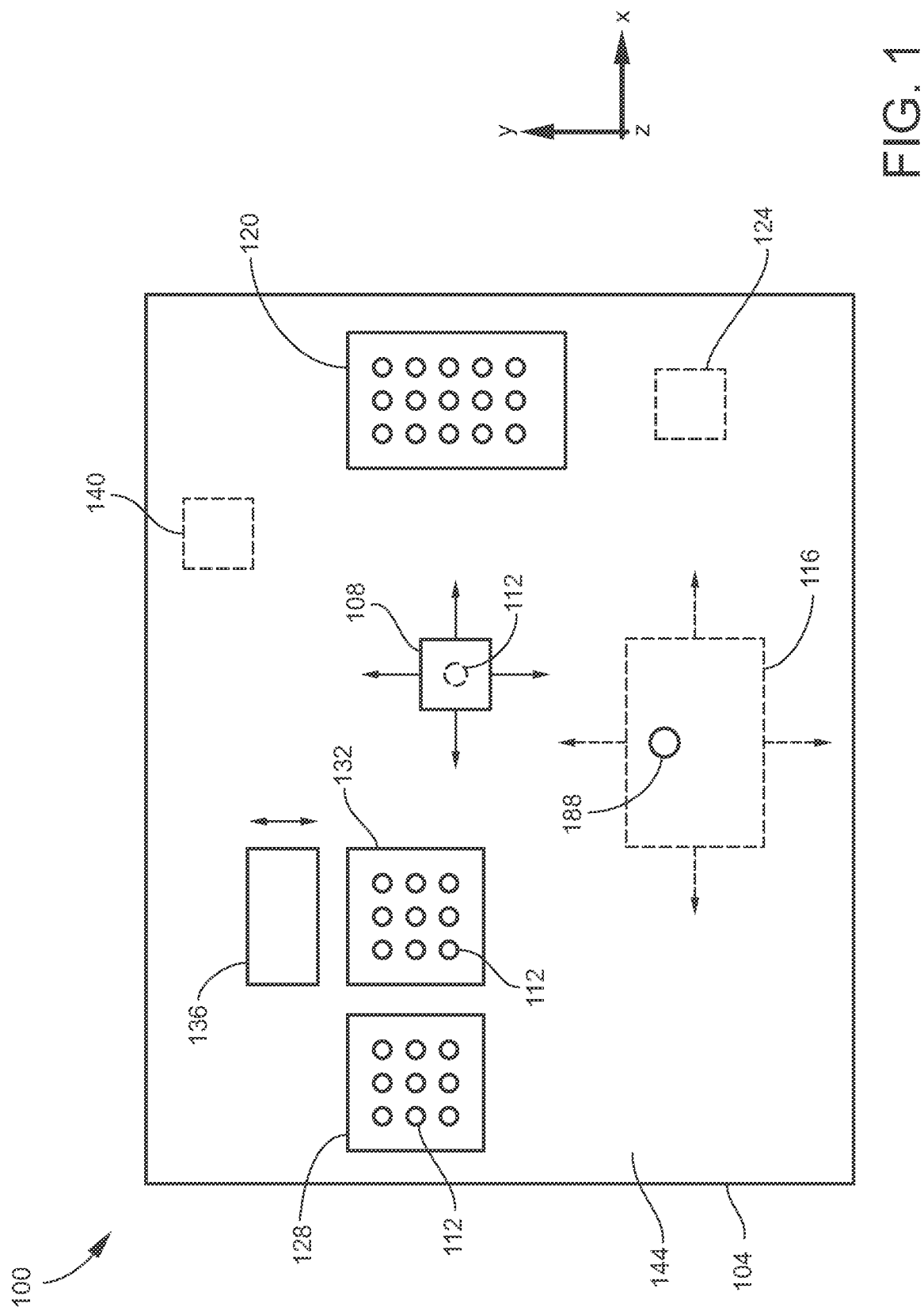
FIG. 1 is a schematic top view of an example of an object picking apparatus according to an embodiment.

As used herein, the term "object" generally refers to a physical object that can be selected from a group of objects. The selected object can be removed, or "picked," from the group of objects and thereby separated from the non-selected objects. In some embodiments, an object is a biological cell. For convenience, as used herein the term "biological cell" refers to one or more biological cells or microbes (e.g., a cell colony or microbial colony).

As used herein, the term "sample" generally refers to a group of objects residing at a single, individually identifiable location. The location may be a sample container. The sample container may be one of a group of sample containers. As examples, a sample container may be a dish, a vial, or a well of a multi-well plate (e.g., a microtiter plate, or "microplate"). When a group of sample containers is provided, different sample containers may contain different samples.

As used herein, the term "light" generally refers to electromagnetic radiation, quantizable as photons. As it pertains to the present disclosure, light may propagate at wavelengths ranging from ultraviolet (UV) to infrared (IR). In the present disclosure, the term "light" is not intended to be limited to electromagnetic radiation in the visible range. In the present disclosure, the terms "light," "photons," and "radiation" are used interchangeably.

Various embodiments disclosed herein involve acquiring images (or "imaging") of an object or other structures (e.g., a pipette tip). Depending on the embodiment and/or the structure being imaged, the image acquisition may be based on fluorescence, reflectance (or scattering), or transmittance. Generally, the imaging of an object (or other structure) involves "excitation light" and "emission light." The imaging of the object entails irradiating the object with the excitation light, and collecting the emission light that is emitted from the object in response to the irradiation. In fluorescence-based imaging, the wavelength of the excitation light (e.g., in the ultraviolet (UV) range) is usually shorter (e.g., bluer) than the wavelength of the (e.g., redder) emission light. The source of the fluorescence-based emission light may be auto-fluorescence from the object, or fluorescence from a fluorophore previously attached to the object. In reflectance-based imaging, the wavelength of the excitation light may be about the same as the wavelength of the emission light. In this case, the light reflected (or scattered) from the object in response to the incident excitation light is the emission light. In transmittance-based imaging, the excitation light incident on the object passes through the object and is attenuated due to absorbance and/or scattering. In this case, the attenuated light emanating from the object is the emission light. In all such cases, for convenience, in the present disclosure "excitation light" refers to the light utilized to irradiate the object, and "emission light" refers to the light collected from the sample in response to the irradiation, regardless of whether the particular instance of acquiring an image is based on fluorescence, reflectance, or transmittance, unless specified otherwise or the context dictates otherwise.

FIG. 1 is a schematic top view of an example of an object picking apparatus 100 according to an embodiment. The object picking apparatus 100 may also be considered a sample analyzing apparatus. In FIG. 1, the various components of the object picking apparatus 100 are schematically arranged in a general or arbitrary manner to facilitate illustration and description. In actual embodiments actually reduced to practice, the positions of the various components relative to each other may differ significantly from what is schematically depicted or suggested in FIG. 1. Also to facilitate illustration and description, FIG. 1 and other drawing figures provide a Cartesian (X-Y-Z) frame of reference, the origin (0, 0, 0) of which has been arbitrarily positioned in the figures. The top view of FIG. 1 is taken to be in the X-Y plane. The term "X-Y plane" is used herein in a general sense as a reference to indicate orientation, without regard for a specific elevational position of the X-Y plane along the Z-axis, unless specified otherwise or the context dictates otherwise. A position along the Z-axis, such as height or elevation, and terms such as "above," "below," "over," "under," and the like, may be considered relative to a flat reference surface in an X-Y plane such as, for example, the surface on which the apparatus 100 is disposed.

The apparatus 100 may generally include a deck 104 (base or platform) relative to which various components may be positioned (e.g., on, over, or under). In the context of the present embodiment, the deck 104 is oriented in the X-Y plane. The apparatus 100 also includes a pipettor 108 positioned over the deck 104. The pipettor 108 may be mounted directly on the deck 104, or supported by the deck 104 through any suitable intermediate support structure such as a gantry (not shown). The pipettor 108 is movable horizontally in the X-Z plane (i.e., along the X- and Y-axes) as indicated by arrows in FIG. 1, and vertically (i.e., along the Z-axis) as indicated by a double arrow in FIG. 2. The pipettor 108 is configured to support at least one pipette tip 112. Generally, the pipettor 108 is configured to aspirate a precise quantity of liquid into the pipette tip 112 and dispense a precise quantity of liquid from the pipette tip 112, and further is configured to transport liquid (and any objects carried in the liquid) stored in the lumen of the pipette tip 112 to various locations of the apparatus 100, as appreciated by persons skilled in the art. This functionality enables the pipettor 108 to perform object picking, as described further below.

The apparatus 100 may support one or more sample (or source) plates 116 and one or more destination plates 120, described further below. The apparatus 100 may further include an imaging system 124, a pipette tip supply station 128, a pipette tip waste station 132, a pipette tip removal (stripper) device 136, and a system controller 140, described further below. In the illustrated embodiment, the sample plate 116, imaging system 124, and system controller 140 are positioned below the deck 104, while in other embodiments one or more of these components may be positioned on or above the deck 104. The sample plate(s) 116 may be movable in the X-Z plane, as indicated by arrows in FIG. 1, or additionally along the Z-axis. The destination plate(s) 120 may also be movable in the X-Z plane, or additionally along the Z-axis.

The apparatus 100 may include other devices, stations, systems, lab ware, and the like (not shown) configured to carry out functions relating to sample preparation, sample handling, liquid handling, sample analysis, assaying, etc. For example, the apparatus 100 may include devices configured to add reagents, buffers, labels, and the like to samples supported by the sample plate 116 or destination plate 120. The apparatus 100 may also include support structures for stacking sample plates 116 and/or destination plates 120. The apparatus 100 may also include automated (e.g., robotic) devices for loading components (e.g., sample plates 116, destination plates 120, containers of new and used pipette tips 112, etc.) at the apparatus 100 and removing such components from the apparatus 100. Such robotic devices may include gripping components or other types of end effectors. The apparatus 100 may also include, or be integrated with or coupled to, devices utilized for sample preparation, and analytical instruments in addition to the imaging system 124. Generally, the various devices, stations, systems, lab ware, and the like that may be utilized or operated prior to and after object picking are known to persons skilled in the art, and thus need not be described in detail herein.

Figure 2:
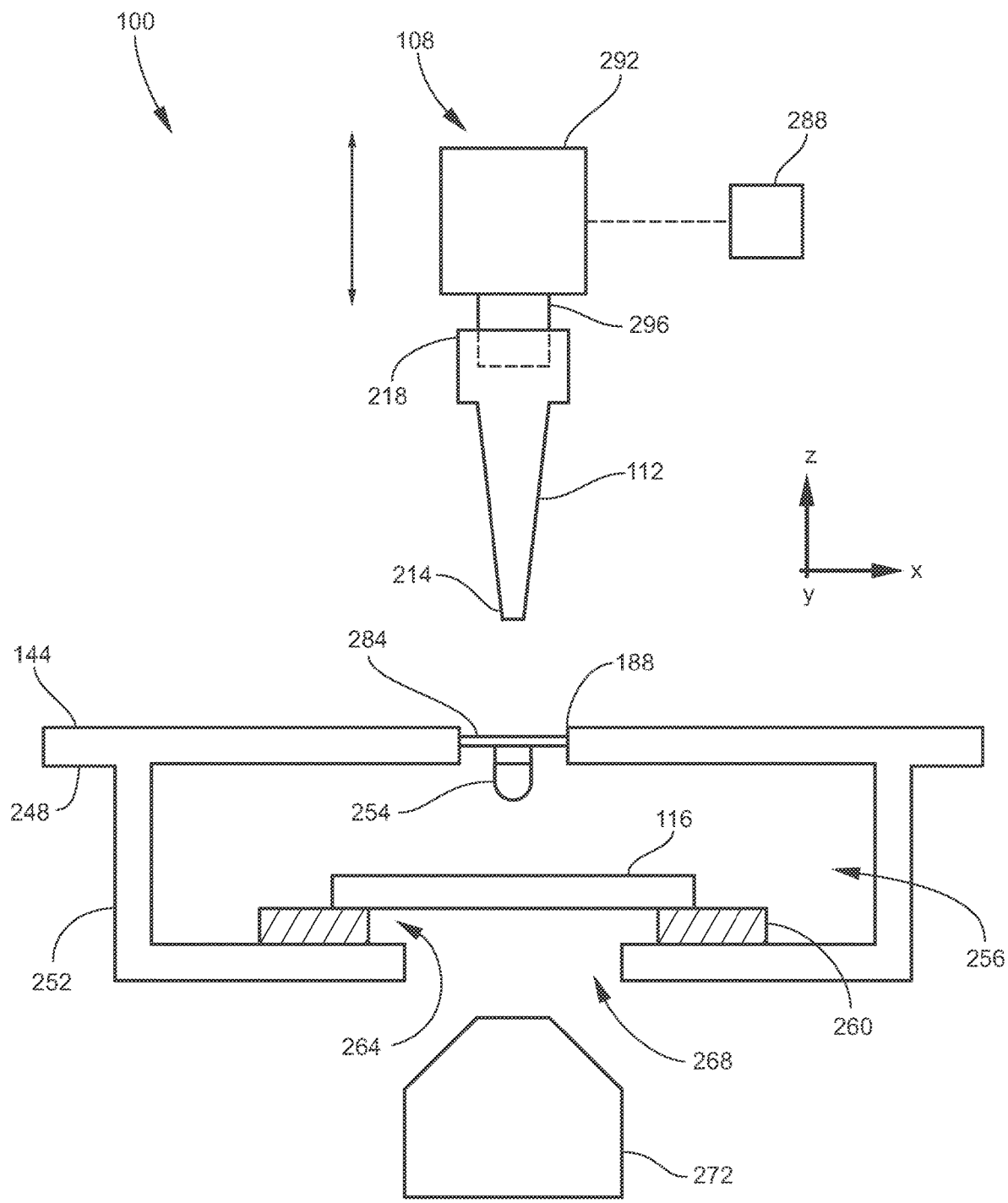
FIG. 2 is a schematic elevation view of the object picking apparatus in the X-Z plane.

FIG. 2 is a schematic elevation view of the object picking apparatus 100 in the X-Z plane. The deck 104 may form a part of, or be enclosed by, a housing or enclosure (not shown) extending above and/or below the deck 104. Such housing may include one or more doors providing access to various components positioned in the interior of the apparatus 100, above and/or below the deck 104. The deck 104 generally includes a top surface 144, a bottom surface 248 (FIG. 2), and a thickness in the Z-direction between the top surface 144 and the bottom surface 248. In the present embodiment, the deck 104 and one or more walls 252 define a sample chamber 256 below the deck 104. One or more sample plates 116 may be loaded into the sample chamber 256, such as via a door (not shown) providing selective access into the sample chamber 256. The sample chamber 256 may be configured to provide an environment isolated from the ambient, particularly for biological samples, and thereby facilitate incubation, cell culturing, or other processes. For example, the sample chamber 256 may cooperate with other devices (e.g., gas supply, heater, etc.) of the apparatus 100 to provide a controlled environment (e.g., gas composition, gas pressure, temperature, etc.) in the interior of the sample chamber 256.

The sample plate 116 is supported on a sample stage 260. At least a bottom section of the sample plate 116 (below where a sample is supported) may be optically transparent to enable imaging of samples from below the sample plate 116. The sample chamber 256 and the sample stage 260 may include respective openings 264 and 268 to provide an optical light path between the sample plate 116 and an objective 272 (objective lens) of the imaging system 124 (FIG. 1) located below the sample chamber 256.

Figure 3:
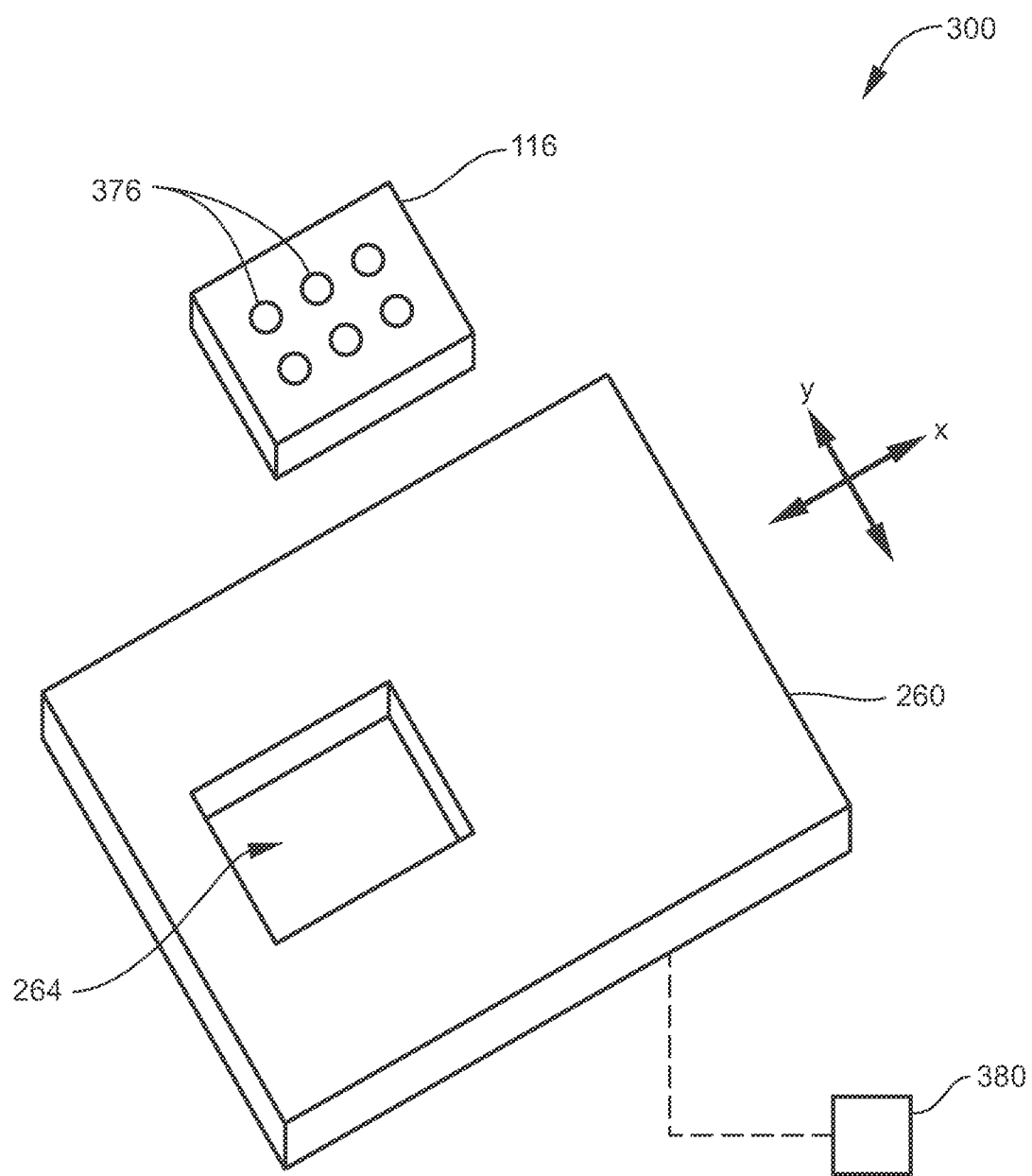
FIG. 3 is a schematic view of a sample plate and a sample staging system of the apparatus.

FIG. 3 is a schematic view of the sample plate 116 (or sample holder, or sample support) and a sample staging system 300 of the apparatus 100. The sample plate 116 may include one or more sample containers 376 configured for holding respective samples. For example, the sample plate 116 may include a plurality of sample containers 376 arranged as a one-dimensional (linear) or two-dimensional array of sample containers 376. In the present context, the term "include" encompasses embodiments in which the sample containers 376 are discrete, removable components (such as petri dishes, vials, etc.) supported on the sample plate 116, and embodiments in which the sample containers 376 are integrated with the sample plate 116. Thus, in the latter example, the sample plate 116 may be a multi-well plate (i.e., a microtiter plate, or "microplate") in which the sample containers 376 are integrally formed wells. In a typical embodiment, the wells are arranged in a two-dimensional array having a 2:3 row-to-column ratio. Such a multi-well plate may have a standard format, such as a 24-well, 96-well, or 384-well, or 1536-well format. The sample containers 376 may be cylindrical or polygonal. The bottoms of the sample containers 376 may be flat or tapered (conical or curved). The sample containers 376 or at least the bottoms thereof may be optically transparent.

The opening 264 of the sample stage 260 is sized such that when the sample plate 116 is mounted onto the sample stage 260, all of the sample containers 376 are addressable by the objective 272 (FIG. 2). The sample stage 260 may include mounting features (not shown) configured to precisely locate the sample plate 116 over the opening 264.

The sample staging system 300 includes the sample stage 260 and a sample stage robot 380 in mechanical communication with the sample stage 260, as schematically depicted by a dashed line. The sample stage 260 may generally include one or more carriages (e.g., stages) configured to move the sample stage 260 along the X-axis and the Y-axis, or additionally along the Z-axis. The sample stage robot 380 may generally include motors (e.g., reversible stepper motors) configured to drive the carriages via suitable transmission links (e.g., screws, belts, etc.) depicted by the dashed line. The configuration and operation of automated X-Y and X-Y-Z staging devices is generally known to persons skilled in the art, and thus need not be described in further detail in the present disclosure. The sample staging system 300 may be utilized to optically align a selected sample container 376 with the objective 272, i.e. align the selected sample container 376 with the field of view of the objective 272. The sample staging system 300 may sequentially align other sample containers 376 included with the sample plate 116 with the objective 272. Depending on factors such as the size of the sample container 376 and the magnification of the objective 272, the field of view of the objective 272 may span the entire (X-Y cross-sectional area of the) sample container 376 or only one portion of the entire (X-Y cross-sectional area of the) sample container 376. The sample staging system 300 may sequentially align different portions (e.g., quadrants) of the sample container 376 with the objective 272. Thus, the sample staging system 300 may be utilized to select different sample containers 376, or different portions of a selected sample container 376, for imaging. The sample staging system 300 may also be utilized to locate the pipette tip 112 relative to a selected object residing in a selected sample container 376, as described further below.

Referring back to FIG. 2, the deck 104 includes a shutter 284 configured to alternately open and close an aperture 188 extending through the thickness of the deck 104 along the Z-axis. Opening the shutter 284 enables the pipette tip 112 to move into the sample chamber 256 and into proximity with a sample container 376 aligned with the pipette tip 112. Opening the shutter 284 also enables an optical path to be established between the pipette tip 112 and the objective 272, thereby enabling the pipette tip 112 to be imaged, as described further below.

As also illustrated in FIG. 2, the pipettor 108 includes a pipettor robot 288 and a pipette head 292 driven by the pipettor robot 288 typically along the X-, Y-, and Z-axes via suitable transmission links (e.g., screws, belts, etc.) depicted by a dashed line. The pipette tip 112 includes a distal end 214, an axially opposite proximal end 218, and a lumen extending along the length of the pipette tip 112 from the respective openings of the distal end 214 and the proximal end 218. The proximal end 218 may be mounted to an adaptor 296 of the pipette head 292. The adaptor 296 may allow different sizes and models of pipette tips to be mounted thereto. The pipettor 108 also includes a pump in fluid communication with the pipette tip 112. The pump is configured to alternately create positive and negative pressure differentials across the lumen of the pipette tip 112, and thereby enable liquid to be aspirated into the pipette tip 112 and dispensed from the pipette tip 112. The pump may be part of the pipette head 292 or positioned separate from the pipette head 292. The lumen of the pipette tip 112 may be sized to enable liquid aspirated into the pipette tip 112 (at least the amounts of liquid contemplated by typical embodiments of the present disclosure) to be stored in the pipette tip 112, i.e., without needing to be flowed into a reservoir separate from the pipette tip 112.

As shown in FIG. 1, in some embodiments the pipette tip supply station 128 and the pipette tip waste station 132 are provided. The pipette tip supply station 128 may include a rack, box, or other structure configured to provide unused pipette tips 112. The pipette tip waste station 132 may include a rack, box, or other structure configured to receive used pipette tips 112. The pipette head 292 is movable to the pipette tip supply station 128, and is further movable to enable an unused pipette tip 112 to be coupled to the pipette head 292. The pipette head 292 is also movable to the pipette tip waste station 132, and is further movable to enable a used pipette tip 112 to be decoupled (stripped) from the pipette head 292. The pipette tip removal (stripper) device 136 is configured to be movable into engagement with the used pipette tip 112 to assist in decoupling the used pipette tip 112 from the pipette head 292, as appreciated by persons skilled in the art. In other embodiments, the apparatus 100 may include a rinse station (not shown) at which a used pipette tip 112 may be rinsed for reuse.

Figure 4:
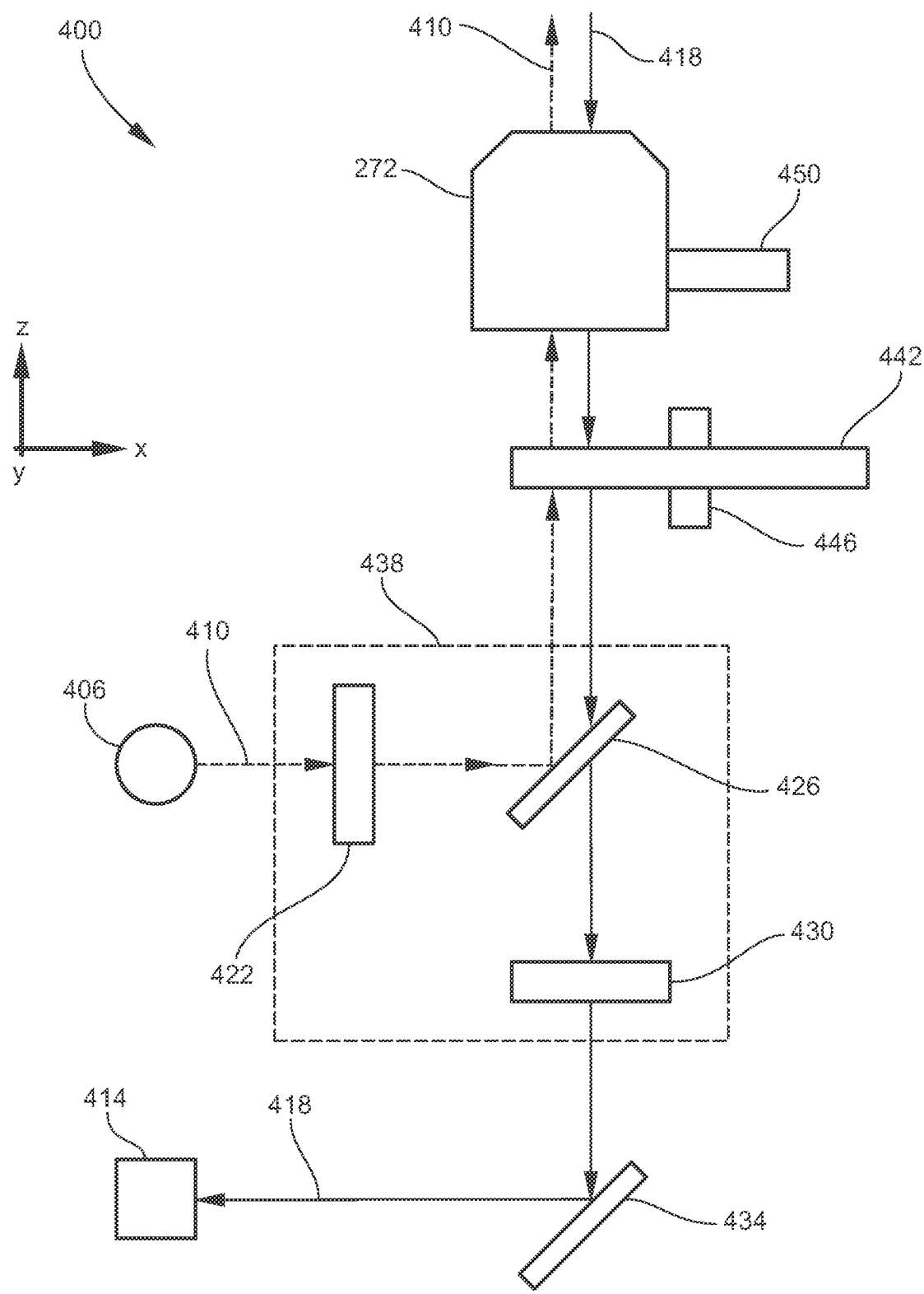
FIG. 4 is a schematic view of an imaging system that may be provided in the apparatus.

FIG. 4 is a schematic view of an imaging system 400 that may be provided in the apparatus 100, i.e., which may correspond to the imaging system 124 shown in FIG. 1. Generally, the structure and operation of various types of imaging systems, including microscope-based imaging systems, are understood by persons skilled in the art, and thus certain components and features of the imaging system 400 are described only briefly to facilitate an understanding of the subject matter taught herein. The imaging system 400 may generally include a light source 406, a camera (or image sensor) 414, and optics (i.e., a set of optical components). The optics may include excitation optics configured to direct excitation light 410 from the light source 406 to a sample via the objective 272, and emission optics configured to direct emission light 418 from the sample via the objective 272 to the camera 414.

The light source 406 may be a light emitting diode (LED), laser diode (LD), laser, etc. In other embodiments, other light sources such broadband light sources may be provided. The light source 406 may be configured to generate excitation light 410 at different selectable wavelengths, depending on whether the camera 414 is to image an object based on reflectance (or scattering), transmission, or fluorescence. For this purpose, the light source 406 may include a plurality of light sources (or light source units) configured to generate excitation light 410 at different selectable wavelengths, and/or the excitation optics may be configured to filter the excitation light 410 at different selectable wavelengths. The light source 406 may include a light source holder configured as a motorized wavelength selector that enables switching between different light sources, as appreciated by persons skilled in the art. For example, the light source holder may be or include a rotatable wheel or a linearly translatable slider to which multiple LEDs (or other light source units) are mounted.

Generally, the excitation optics may include, for example, one or more lenses, diaphragms, apertures, filters, light guides (e.g., optical fibers), mirrors, beam splitters, etc., as needed to define an optical path for excitation light 410 to propagate from the light source 406 to the objective 272 (and through the objective 272 to a sample). In the present embodiment, the excitation optics include an excitation filter 422, a dichroic mirror 426, and the objective 272. The excitation filter 422 is configured to pass only the excitation light 410 (i.e., a specific wavelength or narrow band of wavelengths associated with the excitation light 410) further through the optical system, while blocking other light such as stray light. The excitation filter 422 may be configured to function as a motorized wavelength selector that enables switching between different excitation filters (or excitation filter units), thereby enabling the excitation light 410 to be selectively filtered at different wavelengths, as appreciated by persons skilled in the art. For example, the excitation filter 422 may include a rotatable wheel or a linearly translatable slider to which a plurality of excitation filters are mounted. The multiple excitation filters are composed of materials having different optical transmission characteristics. Hence, different excitation filters of the excitation filter 422 may transmit light at different respective wavelengths while blocking other wavelengths.

The dichroic mirror 426 is configured to reflect excitation light 410 and pass emission light 418, or vice versa, as appreciated by persons skilled in the art. To enable the reflecting or passing of different selected wavelengths of emission light 418 (or excitation light 410), the dichroic mirror 426 may include a plurality of dichroic mirrors (or dichroic mirror units) mounted to a rotatable or translatable wavelength selector, similar to the case of the excitation filter 422.

Generally, the emission optics may include, for example, one or more lenses, diaphragms, apertures, filters, light guides (e.g., optical fibers), mirrors, beam splitters, etc., as needed to define an optical path for emission light 418 from the objective 272 (from a sample through the objective 272) to the camera 414. In the present embodiment, the emission optics include an emission filter 430, one or more mirrors 434, the dichroic mirror 426, and the objective 272. Due to the configuration of the present embodiment, the dichroic mirror 426 and the objective 272 may be considered as being part of both the excitation optics and the emission optics. The emission filter 430 is configured to pass only the emission light 418 (i.e., a specific wavelength or narrow band of wavelengths associated with the emission light 418) further through the optical system, while blocking other light such as the excitation light 410 and stray light. The emission filter 430 may be configured to function as a motorized wavelength selector that enables switching between different emission filters (or emission filter units), thereby enabling the emission light 418 to be selectively filtered at different wavelengths, as appreciated by persons skilled in the art. For example, the emission filter 430 may include a rotatable wheel or a linearly translatable slider to which a plurality of emission filters are mounted. The multiple emission filters are composed of materials having different optical transmission characteristics. Hence, different emission filters of the emission filter 430 may transmit light at different respective wavelengths while blocking other wavelengths.

In some embodiments, the excitation filter 422, the dichroic mirror 426, and the emission filter 430 may be integrated in a filter cube 438, as appreciated by persons skilled in the art. To enable selective filtering of the excitation light 410 and the emission light 418 at different respective wavelengths, the filter cube 438 may include a plurality of filter cubes (or filter cube units) mounted to a rotatable or translatable wavelength selector, as appreciated by persons skilled in the art. The filter cube 438 thus allows different sets of excitation filters, dichroic mirrors, and emission filters to be selected for a given application. In other embodiments, each filter cube unit may include an excitation filter unit and a dichroic mirror only, or a dichroic mirror and an emission filter only.

The imaging system 400 may be configured for wide-field and/or or confocal imaging. In the case of confocal imaging, the imaging system 400 may include a confocal spinning disk 442, also known as a scanning disk or Nipkow disk, positioned in the paths of the excitation light 410 and the emission light 418. A typical spinning disk includes multiple apertures arranged along one or more spiral paths, as appreciated by persons skilled in the art. Scanning is implemented by spinning the disk at a high angular velocity, for example thousands of revolutions per minute (RPM). The spinning disk 442 is mounted to a shaft or spindle 446 coaxial with the central axis of the spinning disk 442. Rotation of the shaft 446 is powered by a suitable motor (not shown). In some embodiments, the spinning disk 442 is selectively movable into and out from the excitation and emission light paths to enable selection between confocal and wide-field operations.

The camera 414 may be any imaging device suitable for wide-field and/or or confocal microscopy. In typical embodiments, the camera 414 is a multi-pixel (or pixelated) imaging device such as, for example, a charge-coupled device (CCD), or an active-pixel sensor (APS) based on complementary metal-oxide-semiconductor (CMOS) technology.

Generally, the objective 272 may be any lens or system of lenses configured for transmitting and focusing the excitation light 410 onto a focal plane in the thickness of the sample, and collecting the emission light 418 emitted from the sample and focusing the emission light onto the sensing plane of the camera 414. The objective 272 may be mounted to an objective stage 450 configured to move the objective 272 along the Z-axis (vertical direction) toward and away from the sample stage 260. The movement or adjustment of the objective 272 along the Z-axis allows for focusing images of the sample and scanning the sample through its thickness along the Z-axis. Z-axis adjustment also enables the focal plane of the objective 272 to be moved to the distal end 214 of the pipette tip 112 for imaging the distal end 214 from below the pipette tip 112, as described further below. The objective stage 450 may also be movable (e.g., rotatable or slidable) to enable different objectives 272 (e.g., objectives having different magnifications) to be selected and switched into the excitation and emission light paths. The imaging system 400 may include other types of lenses (e.g., relay lenses, field lenses, tube lenses, cylindrical lenses, beam expanders, etc.) as needed for a particular embodiment, as appreciated by persons skilled in the art.

It will be understood that the configuration of the imaging system 400 illustrated in FIG. 4, which is similar to an epi-florescence configuration, is but one example. Other configurations, in which the various optical components may be arranged or positioned relative to each other in a manner different from what is specifically shown in FIG. 4, may be suitable for implementing the subject matter disclosed herein.

Referring back to FIG. 2, in addition to the (first) light source 406 (FIG. 4) positioned below the sample chamber 256, in some embodiments a second light source 254 may be provided in the sample chamber 256. The second light source 254 may be utilized to irradiate a sample contained on the sample plate 116 from above the sample. The second light source 254 may be positioned above the sample plate 116, opposite to the objective 272 positioned below the sample plate 116. In this case, the excitation light beam is the light beam generated by the second light source 254 at an initial intensity, which is transmitted through the sample. Due to absorbance by and/or scattering in the sample, the light beam incident on the sample becomes attenuated, i.e., the intensity of the incident light beam is reduced. The resulting attenuated light beam is the emission light beam that propagates from the sample, through the objective 272, and to the camera 414 (FIG. 4). As noted above, the shutter 284 can be opened to enable the pipette tip 112 to access a selected sample container 376, and also enable the pipette tip 112 to be imaged by providing a line of sight between the pipette tip 112 and the objective 272. To accommodate the tip access and imaging operations, the second light source 254 may be configured to move in the X-Y plane out of the way of this line of sight, and thus out of the field of view of the objective 272. In one embodiment, the second light source 254 may be mounted to the underside of the shutter 284. By this configuration, the second light source 254 is moved out of the way when the shutter 284 opens.

The operation of the apparatus 100, including a method for picking an object from a plurality of objects, will now be described with additional reference made to FIGS. 5-10.

Figure 5:
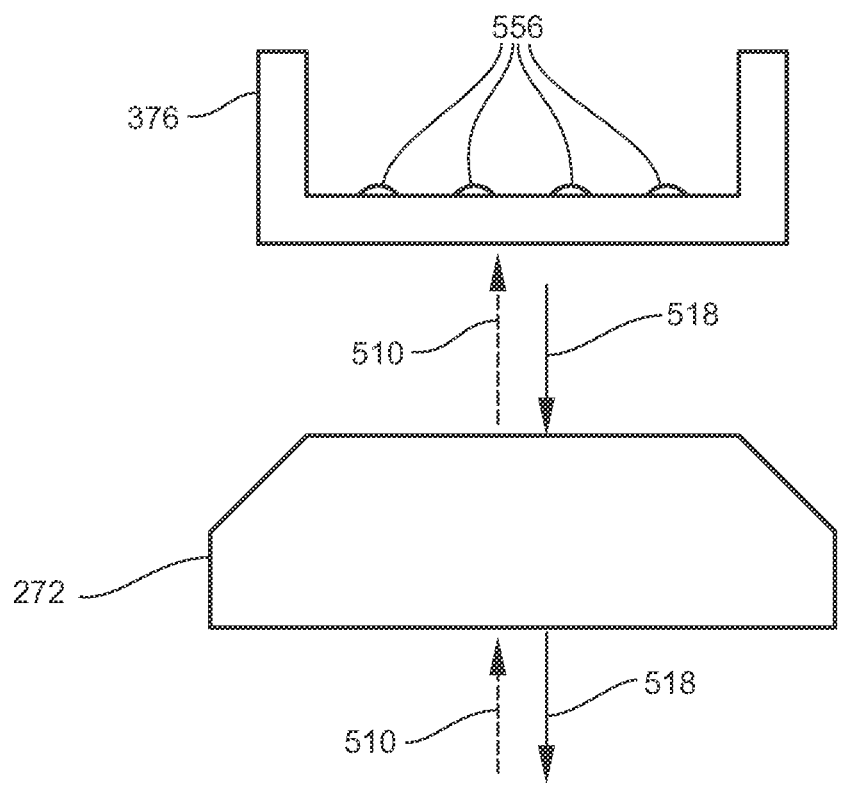
FIG. 5 is a schematic elevation view of a sample container in optical alignment with an objective.

FIG. 5 is a schematic elevation view of a sample container 376 (a well, dish, etc.) in optical alignment with (in the field of view of) the objective 272. A plurality of objects 556 are contained in the sample container 376. The present example will assume the objects 556 are biological objects such as cell colonies supported on (e.g., adhered to) the bottom surface of the sample container 376. Such objects 556 may be immersed in an appropriate solution, as appreciated by persons skilled in the art. Moreover, such objects 556 may have been previously prepared and processed in preparation for picking and analysis, according to known methods. In one embodiment, fluorescence-based imaging is implemented. The source of the fluorescence-based signal may be auto-fluorescence from the objects 556, or fluorescence from fluorophores previously attached to the objects 556.

Prior to imaging the objects 556, the sample container 376 (or a sample plate 116 including the sample container 376), is loaded into the sample chamber 256 (FIG. 2). If the sample plate 116 includes multiple sample containers 376, a sample container 376 is selected, and the sample stage 260 (FIGS. 2 and 3) is operated to move the selected sample container 376 into optical alignment with the objective 272. Also prior to imaging the objects 556, a wavelength for the excitation light and/or a wavelength for the emission light may be selected. Wavelength selection may be done by selecting an appropriate combination of a light source unit of the light source 406 (FIG. 4), and/or excitation filter unit of the excitation filter 422, and/or dichroic mirror unit of the dichroic mirror 426, and/or emission filter unit of the emission filter 430. This may be done, for example, by operating one or more wavelength selectors as described above. In addition, the magnification of the image may be selected by selecting the objective 272 from multiple objectives provided on the objective stage 450. The objective stage 450 may also be operated to move the objective 272 along the Z-axis to focus the objective 272 on the objects 556.

The objects 556 are then imaged by the imaging system 400 (FIG. 4). This is done by operating the light source 406 to generate a (first) excitation light beam 510. The optics of the imaging system 400 direct the excitation light beam 510 through the objective 272 and the transparent bottom of the sample container 376, thereby irradiating the objects 556. In response to the irradiation, the objects 556 emit emission light, which the objective 272 focuses as a (first) emission light beam 518. The optics of the imaging system 400 direct the emission light beam 518 to the camera 414.

The camera 414 receives the emission light beam 518 and in response outputs a first (electrical) output signal to the controller 140 (FIG. 1). The controller 140 processes the first output signal as needed to acquire an image of the objects 556, which may be viewable on a display screen by a user. The controller 140 then analyzes the image to determine which object from the plurality of objects 556 should be selected for further analysis, and thus which object should be picked by the pipettor 108. This analysis may be based on a number of factors, i.e., analysis (or cell picking) parameters such as, for example, a minimum threshold intensity at a particular wavelength of the emission light emitted from an object, morphology or morphometry parameters (e.g., size, shape, and shape factor of object), etc. The analysis parameters may, for example, be entered by a user via a graphical user interface (GUI) provided by the controller 140, or retrieved from a memory of the controller 140 or from a non-transitory computer-readable medium accessible by the controller 140, etc.

Figure 6:
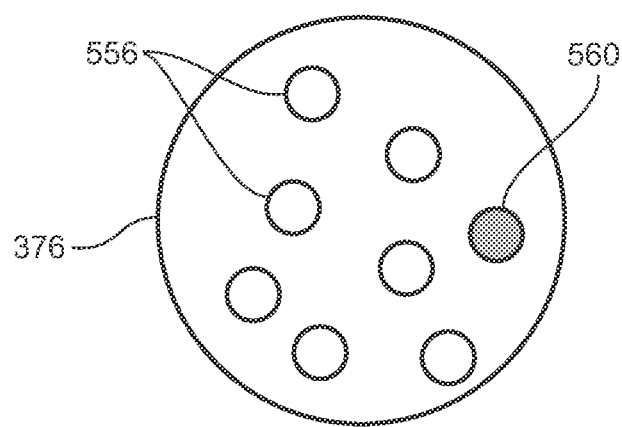
FIG. 6 is a schematic view in the X-Y plane of objects in the sample container, and further illustrating a selected object.

FIG. 6 is a schematic view in the X-Y plane of the objects 556 in the sample container 376, and further illustrating a selected object 560. Once the object 560 has been selected, the controller 140 determines the location of the selected object 560 based on the image data, and identifies (or assigns) a coordinate position (or address) of the selected object 560 (e.g., X1, Y1) corresponding to the location of selected object 560 in the X-Y plane.

Figure 7:
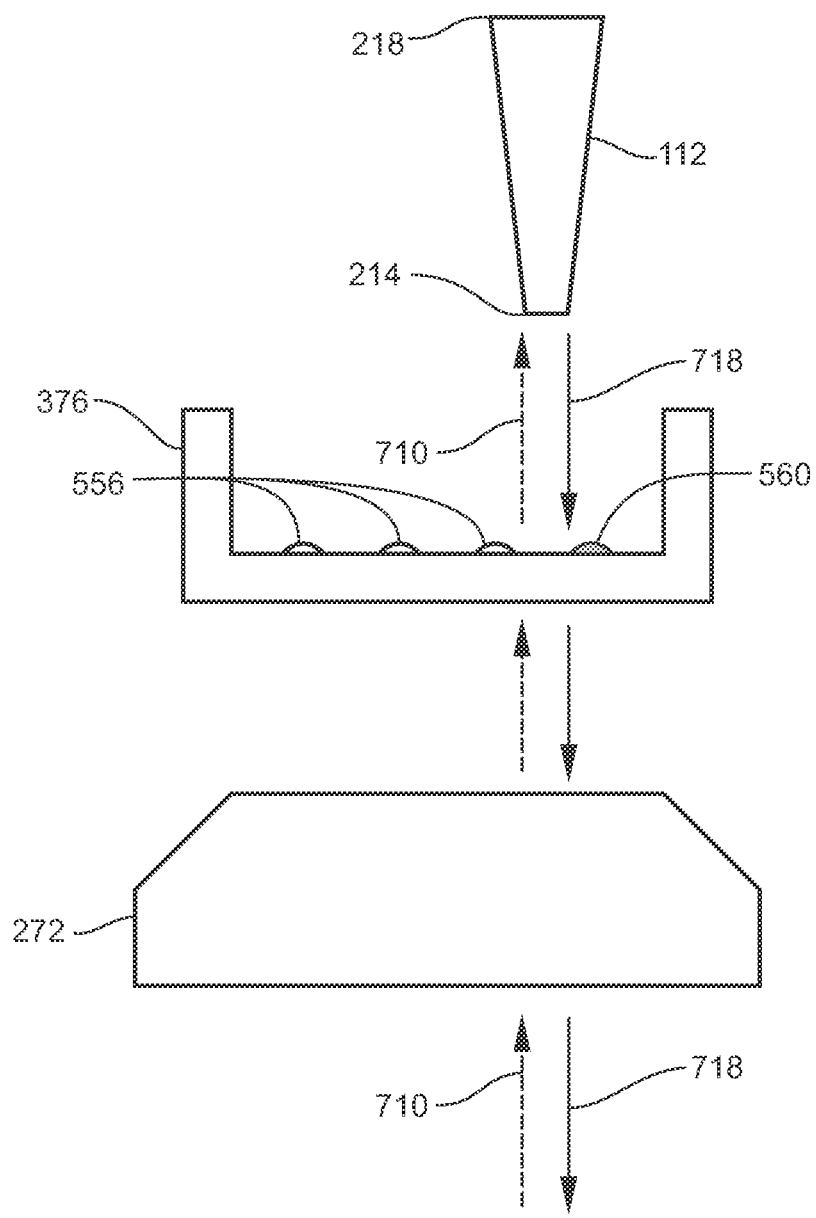
FIG. 7 is a schematic elevation view of the sample container, the objective, and a pipette tip.

FIG. 7 is a schematic elevation view of the sample container 376, the objective 272, and a pipette tip 112. The sample container 376 is the same sample container 376 as shown in FIG. 5, containing the objects 556 including the selected object 560. The sample container 376 has not been moved since the coordinate position of the selected object 560 was determined, and thus the selected object 560 remains at the same coordinate position (X1, Y1). After the coordinate position of the selected object 560 is determined, the pipette head 292 (FIG. 2) is operated to move to the sample container 376, and specifically to a position at which the pipette tip 112 is directly above the selected object 560. For example, based on the known coordinate position (X1, Y1) of the selected object 560, the controller 140 (FIG. 1) may send an appropriate control signal to the pipettor robot 288 to drive the pipette head 292 along a path in the X-Y plane such that when the pipette head 292 reaches the end of this path, the pipette tip 112 is located at a nominal (putative) object-picking position (e.g., X2, Y2) over the selected object 560.

After the pipette tip 112 has reached the nominal position (X2, Y2), the pipette tip 112 is then moved (lowered) along the Z-axis until the distal end 214 of the pipette tip 112 a predetermined (set-point) tip height. The tip height is a position of distal end 214 along the Z-axis that is close enough to the selected object 560 to enable the pipette tip 112 to aspirate the selected object 560 into the lumen of the pipette tip 112. The tip height may be defined relative to any suitable reference X-Y plane. For example, the tip height may be taken to be the distance along the Z-axis between the distal end 214 of the pipette tip 112 and the top surface of the sample plate 116 (FIGS. 2 and 3). In an embodiment, the tip height is on the order of micrometers ($\mu$m). For example, the tip height may be in a range from 10 $\mu$m to 100 $\mu$m. The set-point tip height may be a tip height that has been predetermined to be optimal for object picking by the apparatus 100, which may depend at least in part on the size and model of the pipette tip 112.

Ideally, the nominal coordinate position (X2, Y2) of the pipette tip 112 in the X-Y plane should exactly match the coordinate position (X1, Y1) of the selected object 560. That is, the center of the distal end 214 of the pipette tip 112 (the central axis of the pipette tip 112) should be in exact alignment with the center of the selected object 560. In practice, however, some degree of misalignment of the respective coordinate positions of the pipette tip 112 and the selected object 560 will exist. FIG. 7 illustrates such misalignment in an exaggerated scale. According to the present disclosure, the apparatus 100 is configured to check and correct for such misalignment, in part by imaging (the distal end 214 of) the pipette tip 112. In a typical embodiment, imaging of the pipette tip 112 is based on capturing light reflected from the pipette tip 112, although in other embodiments may be based on capturing light emitted by the pipette tip 112 as a result of auto-fluorescence.

Prior to imaging the pipette tip 112, a wavelength for the excitation light and/or a wavelength for the emission light may be selected. Wavelength selection may be done by selecting an appropriate combination of a light source unit of the light source 406 (FIG. 4), and/or excitation filter unit of the excitation filter 422, and/or dichroic mirror unit of the dichroic mirror 426, and/or emission filter unit of the emission filter 430. This may be done, for example, by operating one or more wavelength selectors as described above. Typically, the wavelength of the first excitation light 510 (FIG. 5) utilized to irradiate the objects 556 is different than the wavelength of the second excitation light 710 utilized to irradiate the pipette tip 112. However, depending on the respective modalities (fluorescence, reflectance, transmittance) utilized to image the objects 556 and the pipette tip 112, in some embodiments the wavelength of the first excitation light 510 may be the same as the wavelength of the second excitation light 710.

To image the pipette tip 112, the light source 406 (FIG. 4) is operated to generate a (second) excitation light beam 710, and the optics of the imaging system 400 direct the excitation light beam 710 through the objective 272 and the transparent bottom of the sample container 376, thereby irradiating the pipette tip 112 (particularly the distal end 214 thereof). In response to the irradiation, the pipette tip 112 emits emission light, which the objective 272 focuses as a (second) emission light beam 718. The optics of the imaging system 400 direct the emission light beam 718 to the camera 414. The camera 414 receives the emission light beam 718 and in response outputs a second (electrical) output signal to the controller 140 (FIG. 1). The controller 140 processes the second output signal as needed to acquire an image of the pipette tip 112, which may be viewable on a display screen by a user. The controller 140 then analyzes the image to determine the location of the pipette tip 112 based on the image data, and identifies (or assigns) a coordinate position (or address) of the pipette tip 112 (e.g., X2, Y2) corresponding to the location of pipette tip 112 in the X-Y plane.

The controller 140 then compares the coordinate position of the pipette tip 112 (X2, Y2) to the coordinate position (X1, Y1) of the selected object 560 to determine whether there is a positional error (e.g., ΔX, ΔY), or offset, between the two coordinate positions. Based on the positional error (assuming an error was found), the pipette head 292 (FIG. 2), or the sample stage 260 supporting the sample container 376, is operated to move until the coordinate position of the pipette tip 112 (X2, Y2) is matched with the coordinate position (X1, Y1) of the selected object 560, e.g. X1=X2 and Y1=Y2, thereby accurately spatially collocating the pipette tip 112 with the selected object 560. For example, based on the calculated positional error (ΔX, ΔY), the controller 140 may calculate an error path in the X-Y plane and send an appropriate control signal to the pipettor robot 288 to drive the pipette head 292 along the error path such that when the pipette head 292 reaches the end of this error path, the coordinate position of the pipette tip 112 matches the coordinate position (X1, Y1) of the selected object 560, i.e., the pipette tip 112 is correctly co-located with the selected object 560. Alternatively, the controller 140 may calculate an error path for the sample stage 260. In this case, the controller 140 may send an appropriate control signal to the sample stage robot 380 (FIG. 3) to drive the sample stage 260 along the error path such that when the sample stage 260 reaches the end of this error path, the pipette tip 112 is correctly co-located with the selected object 560. In either case, the error-corrected coordinate position of the pipette tip 112 (e.g., X2+ΔX, Y2+ΔY) becomes the final object-picking position of the pipette tip 112. At the final object-picking position, the pipette tip 112 is therefore optimally positioned for aspirating the selected object 560.

Figure 8:
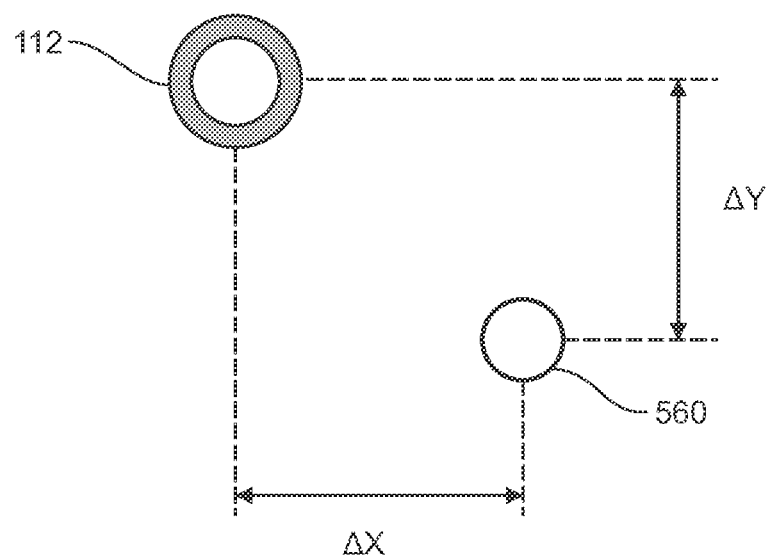
FIG. 8 is a schematic view in the X-Y plane of the pipette tip and the selected object, before correcting a positional error (ΔX, ΔY) between them.
Figure 9:
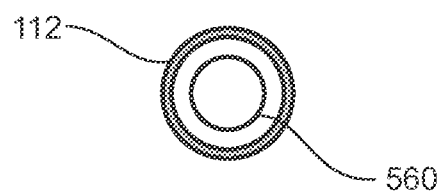
FIG. 9 is a schematic view in the X-Y plane of the pipette tip and the selected object, after correcting the positional error (ΔX, ΔY) between them in accordance with the present disclosure.

FIG. 8 is a schematic view in the X-Y plane of the pipette tip 112 and the selected object 560, before correcting the positional error (ΔX, ΔY) between them. By comparison, FIG. 9 is a schematic view in the X-Y plane of the pipette tip 112 and the selected object 560, after correcting the positional error (ΔX, ΔY) between them in accordance with the present disclosure.

As described above, the pipette tip 112 is moved (lowered) along the Z-axis to a predetermined set-point tip height above the object 560 to be picked. As in the case of the X-Y positioning of the pipette tip 112, the Z-axis positioning of the pipette tip 112 may be prone to error, i.e., lack of precise repeatability from one object picking operation to the next object picking operation. In some embodiments, the apparatus 100 is configured to check and correct for a positional discrepancy in the Z-axis positioning of the pipette tip 112, i.e., a deviation from the prescribed set-point tip height. Thus, after acquiring the image of the pipette tip 112, the controller 140 may analyze the image of the pipette tip 112 to measure the actual tip height, for example the actual distance of the distal end 214 of the pipette tip 112 from the sample plate 116 (FIGS. 2 and 3) along the Z-axis. Measurement of the tip height may be based on, for example, image contrast (e.g., image-based auto-focus, a combination of intensity and sizes (area or diameter) of the visualized tip end, etc. The controller 140 may then determine whether there is a vertical positional error (e.g., ΔZ) between the actual tip height (e.g., Z2) and a set-point tip height (e.g., Z1), i.e., between the distance of the distal end 214 from the sample plate 116 and a set-point distance of the distal end 214 from the sample plate 116. Based on the positional error ΔZ (assuming an error was found), the pipette head 292 (FIG. 2) may be operated to move until the coordinate position of the pipette tip 112 along the Z-axis matches the set-point tip height Z1, e.g, where Z2+ΔZ=Z1. For example, based on the calculated positional error ΔZ, the controller 140 may send an appropriate control signal to the pipettor robot 288 to drive the pipette head 292 along the Z-axis until the actual tip height is equal to the set-point tip height.

After properly aligning the pipette tip 112 over the selected object 560 in the X-Y plane, and optionally also properly locating the pipette tip 112 at a desired tip height, the pipettor 108 (FIG. 2) may then be operated to aspirate the selected object 560 into the pipette tip 112. The pipette head 292 may then be driven to move the pipette tip 112 to any desired location such as a destination plate 120 (FIG. 1) provided on the deck 104. In a case where the destination plate 120 provides multiple containers (e.g., wells of a multi-well plate), the pipette head 292 may move the pipette tip 112 into alignment with a selected container of the destination plate 120 and dispense the selected object 560 from the pipette tip 112 into the selected container. As in the case of the sample plate 116, each container included with the destination plate 120 may be independently identifiable or addressable, such that the specific selected object 560 that was picked may be matched between the image captured from the sample plate 116 and the final location of the selected object 560 in the destination plate 120.

The selected object 560 may then be subjected to further analysis or processing depending on the application, as appreciated by persons skilled in the art. For this purpose, depending on the embodiment, the destination plate 120 may be transported off the deck 104 to another location (analytical instrument, reaction chamber, etc.) by any suitable means.

In another embodiment, the sample plate 116 may also be utilized as a destination plate, in which case a separate destination plate 120 is not utilized. For example, one half of the containers of the sample plate 116 may be utilized to provide an array of samples and the other half of the containers of the same sample plate 116 may be utilized as destination sites for picked objects 560. In such embodiment, the pipette tip 112 may transport a picked object 560 from the sample side to the destination side of the sample plate 116, and dispense the picked object 560 into a selected container on the destination side.

The method and operation described above may be repeated for other objects contained in the same sample container 376 and/or other sample containers 376 included with the sample plate 116.

Figure 10:
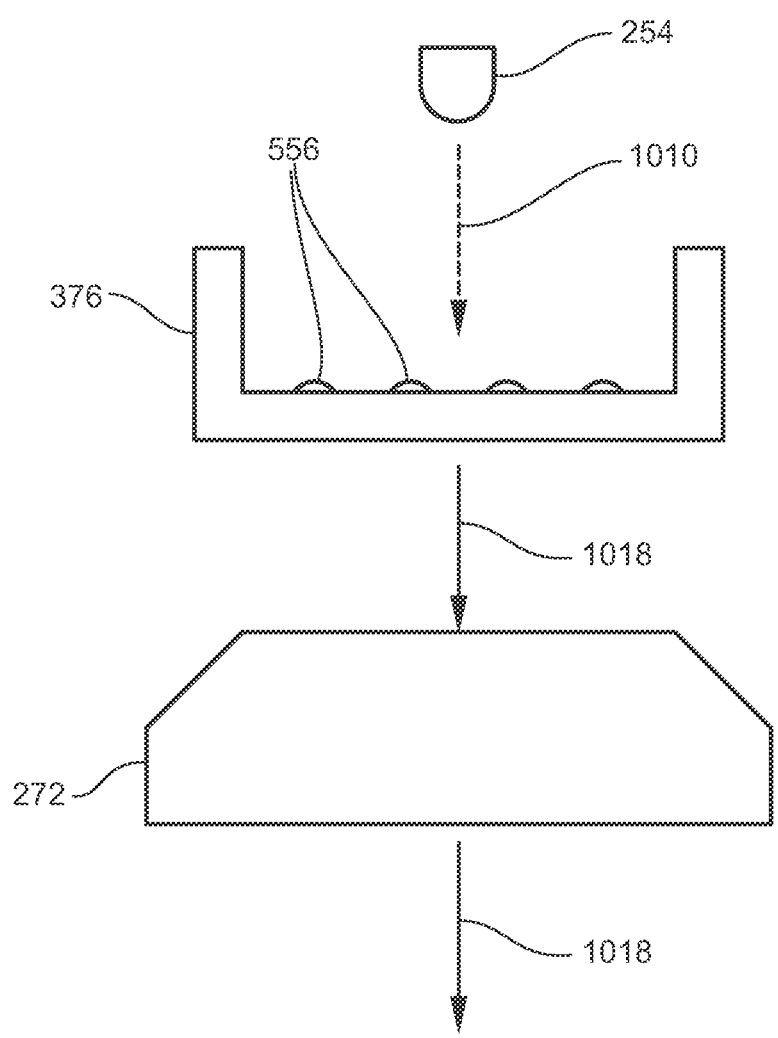
FIG. 10 is a schematic elevation view of the sample container in optical alignment with the objective similar to FIG. 5, and further illustrating a second light source

FIG. 10 is a schematic elevation view of the sample container 376 in optical alignment with the objective 272 similar to FIG. 5, and further illustrating the second light source 254. FIG. 10 illustrates an alternative embodiment in which the objects 556 are irradiated from above, i.e., by the second light source 254 positioned above the objects 556. In this case, the imaging of the objects 556 is based on transmittance. The second light source 254 is operated to generate an excitation light beam 1010 directed toward the objects 556. The excitation light beam 1010 is transmitted through the objects 556, and the intensity of the light is attenuated due to absorbance and/or scattering within the objects 556. The attenuated light is collected and focused by the objective 272 as an emission light beam 1018. The optics of the imaging system 400 direct the emission light beam 1018 to the camera 414, enabling an image of the objects to be captured as described above. When subsequently imaging the pipette tip 112 as shown in FIG. 7, the second light source 254 is moved out of the way and the light source 406 (FIG. 4) is operated to generate a (second) excitation light beam 710 as described above.

As evident from the foregoing description, pipette tip location accuracy is improved by imaging both the selected object 560 and the pipette tip 112 itself on a per-pick basis, thereby enabling the pipette tip 112 to be accurately spatially co-located with the selected object 560. Regardless of any tip-to-tip variation that may be present, the resulting positional error can be corrected. The correction can be made by operating either the pipette head 292 (FIG. 2) or the sample stage 260 to move, whichever has the greater accuracy and precision in motion. Additionally, an auto-focus routine may be utilized to locate the pipette tip 112 in the Z-direction and thereby correct for any tip-to-tip variation in the Z-direction. Instead of relying on finding the location of the pipette tip 112 relative to a robotic arm, embodiments disclosed herein locate the pipette tip 112 relative to selected object 560 to be picked, which may improve the accuracy of the pipette tip locating operation. Moreover, because both the selected object 560 and the pipette tip 112 are located within the same field of view, the magnitude of the "move" between tip detection and corrected location is very small, thereby minimizing any positional errors that might otherwise occur during movement from a remote sensing location. Improving pipette tip location accuracy in accordance with the present disclosure may enable more consistent object picking, increase the picking success rates, and allow picking at increased object densities. Such advantages may result in the ability to provide more objects 556 per sample plate 116, less lab ware, smaller incubators, and higher throughput.

Figure 11:
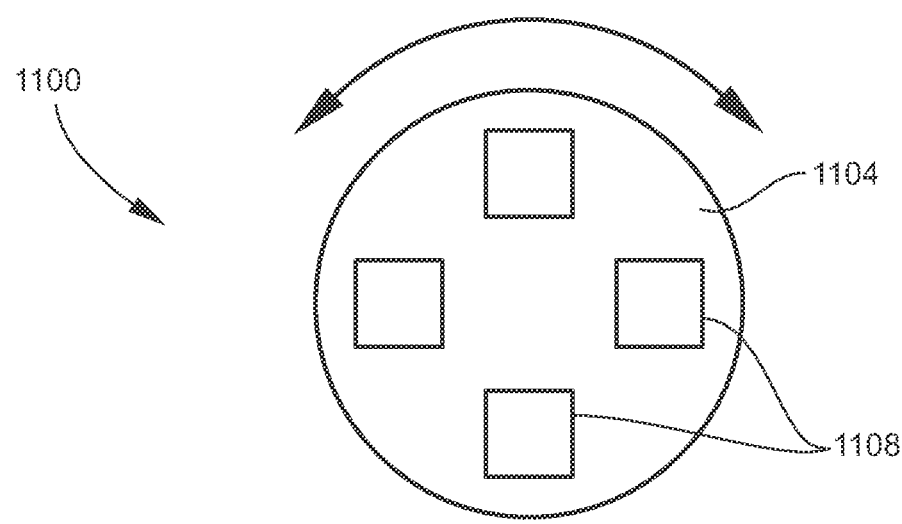

FIG. 11 is a schematic view of an example of a wavelength selector 1100 that may be utilized in any of the embodiments disclosed herein as part of the imaging system. The wavelength selector 1100 includes a support structure 1104 and a plurality of optical elements 1108 mounted to the support structure 1104. The support structure 1104 may be mechanically referenced to a suitable motor (not shown) configured to move (index) the support structure 1104 to a selected position, as appreciated by persons skilled in the art. In the present embodiment, selected positions are angular positions obtainable by rotating the wavelength selector 1100 (i.e., the wavelength selector 1100 is configured as a wheel or carousel), as indicated by an arrow in FIG. 11. At any given angular position, one of the optical elements 1108 is in the excitation light path and/or the emission light path. As described above, the optical elements 1108 may be light sources (e.g. LEDs), excitation filters, emission filters, dichroic mirrors, or filter cubes.

Figure 12:
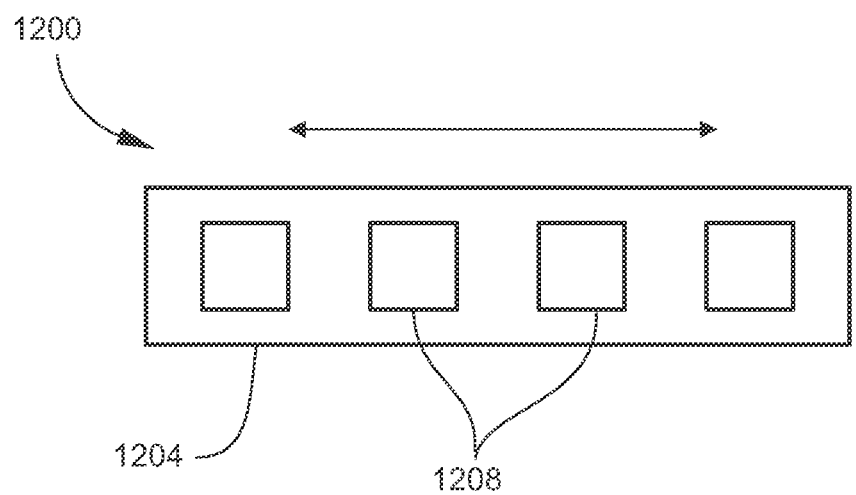

FIG. 12 is a schematic view of another example of a wavelength selector 1200 that may be utilized in any of the embodiments disclosed herein as part of the imaging system. The wavelength selector 1200 includes a support structure 1204 and a plurality of optical elements 1208 mounted to the support structure 1204. In this embodiment, the wavelength selector 1200 is linearly translatable to enable positioning of a selected optical element 1108 in the excitation light path and/or the emission light path. For this purpose, the support structure 1204 may be mechanically referenced to a suitable motor (not shown) configured to move the support structure 1204, as appreciated by persons skilled in the art. As described above, the optical elements 1208 may be light sources (e.g., LEDs), excitation filters, emission filters, dichroic mirrors, or filter cubes.

Figure 13:
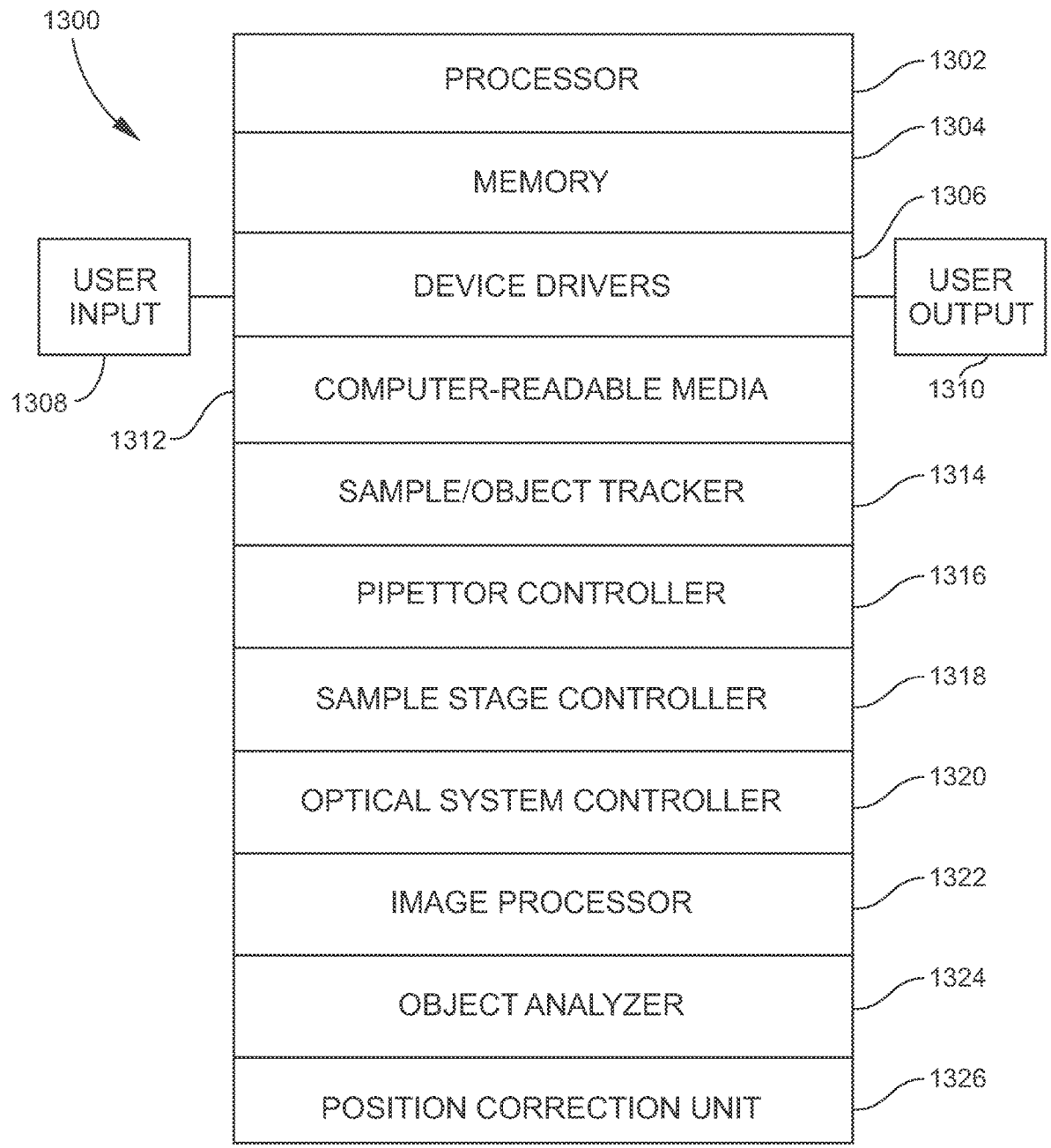

FIG. 13 is a schematic view of a non-limiting example of a system controller 1300, which may correspond to the controller 140 described above and illustrated in FIG. 1. The system controller 1300 typically includes an electronics-based processor 1302, which may be representative of a main electronic processor (e.g., a central processing unit or CPU) providing overall control, and one or more electronic processors configured for dedicated control operations or specific signal processing tasks (e.g., a digital signal processor or DSP, an application-specific integrated circuit or ASIC, a field-programmable gate array (FPGA), a graphics processing unit or GPU, etc.). The system controller 1300 also typically includes one or more memories 1304 (volatile and/or non-volatile types) for storing data and/or software. The system controller 1300 may also include one or more device drivers 1306 for controlling one or more types of user interface devices (user input devices 1308 and user output devices 1310) and providing an interface between the user interface devices and components of the system controller 1300 communicating with the user interface devices. The system controller 1300 may also include one or more types of computer programs or software contained in memory and/or on one or more types of computer-readable media 1312. Computer programs or software may contain instructions (e.g., logic instructions) for controlling or performing all or part of any of the methods and operations disclosed herein. Computer programs or software may include system software and application software. System software may include an operating system (e.g., a Microsoft Windows® operating system) for controlling and managing various functions of the system controller 1300, including interaction between hardware and application software. In particular, the operating system may provide a graphical user interface (GUI) displayable via a user output device 1310 such as a display screen, and with which a user may interact with the use of a user input device 1308 such as a keyboard or pointing device.

The system controller 1300 may also include one or more components or modules (as may be embodied in hardware, firmware and/or software) for controlling or performing all or part of any of the methods and operations disclosed herein, including formatting data for presentation in graphical form by the GUI. These modules may include a materials (sample/object) tracker 1314, a pipettor controller 1316, a sample stage controller 1318, an optical system controller 1320, an image processor 1322, an object analyzer 1324, and a position correction unit 1326. The system controller 1300 may coordinate the operations or functions of the various modules as needed for carrying out the methods disclosed herein. The system controller 1300 may also include devices for receiving and reading (and optionally writing to) the computer-readable media 1312. The materials tracker 1314 may be configured to track the locations (addresses, or coordinate positions) of specific samples provided in specific containers of sample plate(s) 116, and the locations of selected objects 560 having been transported to specific containers of sample plate(s) 116 or destination plate(s) 120. The pipettor controller 1316 may be configured to control the movement and object picking and dispensing operations of the pipettor 108. Optionally, the pipettor controller 1316 also may represent a controller for controlling a pipette tip removal device 136 if provided. The sample stage controller 1318 may be configured to control the movement of the sample stage 260. The optical system controller 1320 may be configured to control various components and operations of the optical system 400, such as activation of the light source 406 and selection/movement of light source units of the light source 406; activation of the camera 414; z-axis focusing and selection/movement of the objective 272; selection/movement of units of the excitation filter 422, dichroic mirror 426, and emission filter 430, or filter cube 438, as may be provided; and activation and movement of the spinning disk 442 if provided.

The image processor 1322 may be configured to acquire images of objects and the pipette tip 112 based on signals received from the camera 414, allowing a user to view the images on a display screen and enabling analysis of the images by the system controller 1300. The object analyzer 1324 may be configured to select, or assisting a user in selecting, objects to be picked from samples. For this purpose, the object analyzer 1324 may execute one or more algorithms based on inputs such as object picking parameters as described above. The position correction unit 1326 may be configured to determine (based on, for example, data provided by the image processor 1322) whether there is a positional error (misalignment) in the X-Y plane between the pipette tip 112 and a selected object, and provide an output enabling the system controller 1300 to correct the X-Y positional error through control of the movement of the pipette tip 112. The position correction unit 1326 also may include a tip height analyzer configured to determine (based on, for example, data provided by the image processor 1322) whether there is a (Z-axis) positional error in the height of the pipette tip 112 relative to the sample plate containing the selected object, and provide an output enabling the system controller 1300 to correct the Z-axis positional error through control of the movement of the pipette tip 112.

It will be understood that FIGS. 1 and 13 provide high-level schematic depictions of an example of the system controller 140 and 1300 and associated components consistent with the present disclosure. Other components may be included as needed for practical implementations, which are not shown but are understood by persons skilled in the art. It will also be understood that the system controller 140 and 1300 is schematically represented in FIGS. 1 and 13 as functional blocks intended to represent structures (e.g., hardware, circuitry, firmware, software, mechanisms, etc.) that may be provided. The various functional blocks and signal links have been arbitrarily located for purposes of illustration only and are not limiting in any manner. Persons skilled in the art will appreciate that, in practice, the functions of the system controller 140 and 1300 may be implemented in a variety of ways and not necessarily in the exact manner illustrated in FIGS. 1 and 13 and described herein.

It will be understood that one or more of the processes, sub-processes, and process steps described herein may be performed by hardware, firmware, software, or a combination of two or more of the foregoing, on one or more electronic or digitally-controlled devices. The software may reside in a software memory (not shown) in a suitable electronic processing component or system such as, for example, the system controller 140 and 1300 schematically depicted in FIGS. 1 and 13. The software memory may include an ordered listing of executable instructions for implementing logical functions (that is, "logic" that may be implemented in digital form such as digital circuitry or source code, or in analog form such as an analog source such as an analog electrical, sound, or video signal). The instructions may be executed within a processing module, which includes, for example, one or more microprocessors, general purpose processors, combinations of processors, digital signal processors (DSPs), application specific integrated circuits (ASICs), field-programmable gate array (FPGAs), etc. Further, the schematic diagrams describe a logical division of functions having physical (hardware and/or software) implementations that are not limited by architecture or the physical layout of the functions. The examples of systems described herein may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., the system controller 140 and 1300 in FIGS. 1 and 13), direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this disclosure, a computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program may be electronically captured via, for instance, optical scanning of the paper or other medium, then compiled, interpreted, or otherwise processed in a suitable manner if necessary, and then stored in a computer memory or machine memory.

It will also be understood that the term "in signal communication" or "in electrical communication" as used herein means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

More generally, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A method for picking an object from a plurality of objects, the method comprising:

providing a plurality of objects on a top surface of a sample container;

irradiating the plurality of objects with an excitation light beam, wherein the plurality of objects in response emits a first emission light beam;

receiving the first emission light beam at a camera, wherein the camera outputs a first output signal;

acquiring an image of the plurality of objects by processing the first output signal;

analyzing the image of the plurality of objects and, based on the analyzing, selecting an object from the plurality of objects and identifying a coordinate position of the selected object in an X-Y plane parallel to the top surface;

moving a pipette tip to a position over the selected object, wherein the excitation light beam irradiates the pipette tip, and the pipette tip in response emits a second emission light beam;

receiving the second emission light beam at the camera, wherein the camera outputs a second output signal;

acquiring an image of the pipette tip by processing the second output signal;

analyzing the image of the pipette tip and, based on the analyzing, identifying a coordinate position of the pipette tip in the X-Y plane;

determining a positional error between the coordinate position of the selected object and the coordinate position of the pipette tip; and based on the positional error, moving at least one of the pipette tip or the sample container to align the pipette tip over the selected object by matching the coordinate position of the pipette tip with the coordinate position of the selected object.

2. The method of claim 1, comprising, before irradiating the plurality of objects, moving the sample container or a portion of the sample container into alignment with a field of view of an objective, wherein the objective is in optical communication with the camera.

3. The method of claim 1, comprising:

before acquiring the image of the plurality of objects, adjusting a focus of an objective on the plurality of objects, wherein the objective is in optical communication with the camera; and before acquiring the image of the pipette tip, adjusting the focus on the pipette tip.

4. The method of claim 1, wherein:

the excitation light beam that irradiates the plurality of objects is a first excitation light beam;

the method further comprises, before acquiring the image of the pipette tip, generating a second excitation light beam, wherein the second excitation light beam irradiates the pipette tip; and the pipette tip emits the second emission light beam in response irradiation by the second excitation light beam.

5. The method of claim 4, wherein the first excitation light beam irradiates the plurality of objects at a first excitation wavelength, and further comprising, before acquiring the image of the pipette tip, selecting a second excitation wavelength at which the second excitation light beam irradiates the pipette tip, the second excitation wavelength being different from the first excitation wavelength.

6. The method of claim 5, wherein the selecting the second excitation wavelength comprises at least one of:

switching from active operation of a first light source unit to active operation of a second light source unit, wherein the first light source unit and the second light source unit generate light at different respective wavelengths;

switching a first excitation filter out of an excitation light path and a second excitation filter into the excitation light path, wherein the excitation light path is between the light source and an objective, and the first excitation filter and the second excitation filter are configured to pass different respective wavelengths of light; and switching a first dichroic mirror out of the excitation light path and a second dichroic mirror into the excitation light path, wherein the excitation light path is between the light source and an objective, and the first dichroic mirror and the second dichroic mirror are configured to reflect or pass different respective wavelengths of light.

7. The method of claim 1, comprising, after aligning the pipette tip over the selected object, aspirating the selected object into the pipette tip.

8. The method of claim 1, comprising:

analyzing the image of the pipette tip to identify an actual distance of the pipette tip from the sample container along a Z-axis orthogonal to the X-Y plane;

determining a positional error between the actual distance and a set-point distance; and based on the positional error between the actual distance and the set-point distance, controlling the pipettor device to move the pipette tip such that the actual distance equals the set-point distance.

9. The method of claim 1, wherein the objects are biological cell colonies.

* * * * *